(12) United States Patent
Glass

(10) Patent No.: US 7,716,585 B2
(45) Date of Patent: May 11, 2010

(54) MULTI-DIMENSIONAL GRAPHICAL DISPLAY OF DISCOVERED WIRELESS DEVICES

(75) Inventor: Andrew C. Glass, Woodinville, WA (US)

(73) Assignee: Microsoft Corporation, Redmond, WA (US)

( * ) Notice: Subject to any disclaimer, the term of this patent is extended or adjusted under 35 U.S.C. 154(b) by 1241 days.

(21) Appl. No.: 10/650,622

(22) Filed: Aug. 28, 2003

(65) Prior Publication Data

US 2005/0048987 A1 Mar. 3, 2005

(51) Int. Cl.
*G06F 15/177* (2006.01)
*G06F 15/16* (2006.01)

(52) U.S. Cl. .................. 715/734; 715/736; 715/738; 715/739

(58) Field of Classification Search ............ 715/734, 715/735, 736, 738, 739, 750, 755, 775, 862; 455/456.1, 16, 414.2
See application file for complete search history.

(56) References Cited

U.S. PATENT DOCUMENTS

| | | | |
|---|---|---|---|
| 5,295,244 A * | 3/1994 | Dev et al. ............. 715/853 |
| 5,586,254 A * | 12/1996 | Kondo et al. ............ 714/25 |
| 5,600,706 A * | 2/1997 | Dunn et al. .......... 455/456.2 |
| 5,678,198 A * | 10/1997 | Lemson ............... 455/67.11 |
| 5,758,288 A * | 5/1998 | Dunn et al. .......... 455/456.5 |
| 5,793,974 A * | 8/1998 | Messinger ............. 709/224 |
| 5,809,265 A * | 9/1998 | Blair et al. ............. 715/764 |
| 5,958,012 A * | 9/1999 | Battat et al. ............ 709/224 |
| 6,091,956 A * | 7/2000 | Hollenberg ........... 455/456.5 |
| 6,222,482 B1 | 4/2001 | Gueziec |
| 6,317,599 B1 * | 11/2001 | Rappaport et al. ......... 455/446 |
| 6,324,577 B1 * | 11/2001 | Hirai ..................... 709/223 |
| 6,327,535 B1 | 12/2001 | Evans et al. |
| 6,393,557 B1 | 5/2002 | Guthridge et al. |
| 6,651,105 B1 | 11/2003 | Bhagwat et al. |
| 6,661,335 B1 * | 12/2003 | Seal ..................... 340/10.1 |
| 6,674,403 B2 * | 1/2004 | Gray et al. ............... 342/463 |
| 7,039,392 B2 * | 5/2006 | McCorkle et al. ......... 455/411 |
| 7,139,557 B2 * | 11/2006 | Tang et al. ............ 455/414.2 |
| 2001/0042118 A1 * | 11/2001 | Miyake et al. ........... 709/223 |
| 2003/0124977 A1 * | 7/2003 | Smith et al. .............. 455/16 |
| 2003/0143992 A1 * | 7/2003 | Humphrey et al. ......... 455/420 |
| 2004/0073538 A1 * | 4/2004 | Leishman et al. .......... 707/3 |
| 2005/0020275 A1 * | 1/2005 | Agrawala et al. ........ 455/456.1 |

OTHER PUBLICATIONS

Author: Tim Kindberg, John Barton, Jeff Morgan, Gene Becker, Debbie Caswell, Philippe Debaty, Gita Gopal, Marcos Frid, Venky Krishnan, Howard Morris, John Schettino, Bell Serra. Title: People, Places, Things: Web Presence for the Real Word. Tittle Date: Feb. 2000. Publisher: Hewlett-Packard Company. Pertinent Pages: 18 pages.*

(Continued)

*Primary Examiner*—Ba Huynh
*Assistant Examiner*—Nicholas Augustine
(74) *Attorney, Agent, or Firm*—Wolf, Greenfield & Sacks, P.C.

(57) ABSTRACT

A device discovery and presentation system. The architecture facilitates automatically sensing devices, ports, or other wirelessly identifiable entities by detecting such entities, and displaying a 2-D or 3-D representation of the relative location of such entities to a user via a display. The architecture may be controlled to detect such entities in a confined envelope of space for a specified distance.

64 Claims, 11 Drawing Sheets

OTHER PUBLICATIONS

Author: Erik Guttman. Tittle: Service Location Protocol: Automatic Discovery of IP Network Services, IEEE Internet Computing, v.3. Publisher Date: Jul. 1999. Pertinent pages: p. 71-79.*

Author: Petros, Meman Roussopoulos, Ed Swierk Lai, Guido Appenzeller, Xinhau Zhao, Mary Baker. Tittle: The Mobile People Architecture. Tittle Date: Jul. 1999. ACM SIGMOBILE Mobile Computing and Communications Review, v.3 n.3; pp. 36-42.*

Bill N. Schilit, et al., Disseminating Active Map Information to Mobile Hosts, IEEE Network, 1994, pp. 22-32, vol. 8.

Maarten Van Steen, et al., Locating Objects in Wide-Area Systems, IEEE Commun. Mag., Jan. 1998, 36(1):104-109.

Vasileios Zeimpekis, et al., A Taxonomy of Indoor and Outdoor Positioning Techniques for Mobile Location Services, ACM SIGecom Exchanges, 2003, pp. 19-27, vol. 3, Issue 4.

* cited by examiner

MULTI-DIMENSIONAL GRAPHICAL DISPLAY OF DISCOVERED WIRELESS DEVICES

TECHNICAL FIELD

This invention is related to device discovery in wireless network regime

BACKGROUND OF THE INVENTION

Recent advances in wireless communications have facilitated an ever-increasing mobile economy. Telephones, personal data assistants, wireless mice and keyboards, and other wireless devices are increasing in popularity at a rapid pace. To accommodate such devices, companies are providing as a service networks and peripherals that may be accessed by these wireless devices as customers avail themselves of the vendor's product and services. However, finding wireless devices is often confusing.

Traditional location services provide device location information based on hard-coded coordinates corresponding to stationary objects. However, this requires administrative overhead and that the devices remain stationary.

What is needed is an improved device discovery architecture that is a simple and intuitive way to find wireless devices.

SUMMARY OF THE INVENTION

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

The present invention disclosed and claimed herein, in one aspect thereof, comprises architecture for obtaining device locations, and generating a three-dimensional (3-D) display representative of the location of the devices. Traditional location services provide device location information based on hard-coded coordinates corresponding to stationary objects. The subject invention provides for dynamic 3-D location displays based upon detection of device coordinates and representation of location of the device on a display. The invention utilizes wireless radio position calculation methods to dynamically identify wireless devices and provide location information. Given that a wireless radio can return location of remote devices in 3-D space, the processing power and presentation capabilities of the current generation of computing devices (PCs, PDAs) can be used for presenting a 3-D representation of all devices in the area that may be of interest. For example, the 3-D capabilities of the present invention can distinguish that a new mouse, from among other wireless mice within a particular range, is available. In another example, a traveler can arrive at an airport lounge and via the invention detect printers, scanners, and other devices of interest and know where they are located.

To the accomplishment of the foregoing and related ends, certain illustrative aspects of the invention are described herein in connection with the following description and the annexed drawings. These aspects are indicative, however, of but a few of the various ways in which the principles of the invention may be employed and the present invention is intended to include all such aspects and their equivalents. Other advantages and novel features of the invention may become apparent from the following detailed description of the invention when considered in conjunction with the drawings.

DETAILED DESCRIPTION OF THE INVENTION

Figure 1:
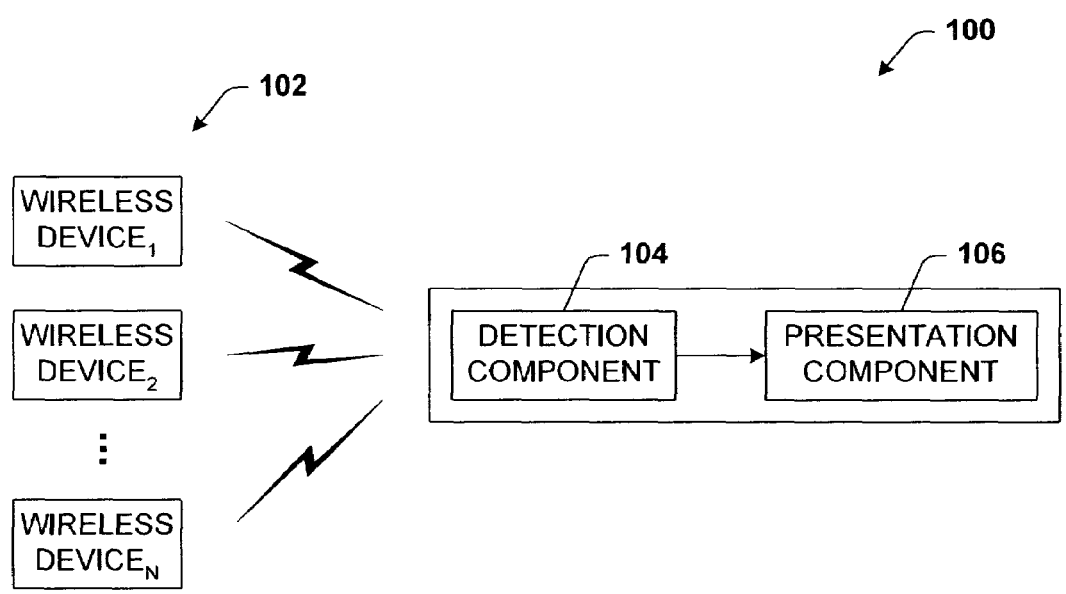
FIG. 1 illustrates a general block diagram of a system of the present invention.

The present invention is now described with reference to the drawings, wherein like reference numerals are used to refer to like elements throughout. In the following description, for purposes of explanation, numerous specific details are set forth in order to provide a thorough understanding of the present invention. It may be evident, however, that the present invention may be practiced without these specific details. In other instances, well-known structures and devices are shown in block diagram form in order to facilitate describing the present invention.

As used in this application, the terms "component" and "system" are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers.

As used herein, the term "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic-that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

Referring now to FIG. 1, there is illustrated a general block diagram of a system 100 in accordance with the invention. The system 100 facilitates detecting one or more wireless devices 102 (also denoted WIRELESS DEVICE$_1$, WIRELESS DEVICE$_2$, ..., WIRELESS DEVICE$_N$) for presentation to a user of the system 100. The system 100 includes a detection component 104 that senses and distinguishes the one or more devices 102 from each other in multi-dimensional space. The devices 102 may be dispersed in a substantially planar area or may also be dispersed in 3-dimensional space over several floors of a building. Once detected, the system 100 utilizes a presentation component 106 to provide a graphical representation of the devices 102 on a display of the system 100. The presentation component 106 can also include an audio component that provides audio output in lieu of or in combination with presenting the device locations. The audio capability can facilitate a user finding the device or location that is detected by providing directions to the user of the location of the detected device. The audio signals can be communicated to the user via headphones, or via a speaker (not shown) of the system 100.

The devices 102 may include any suitable wireless devices, whether mobile, movable, or stationary, e.g., a printer, scanner, mouse, keyboard, desktop and/or portable computer, portable data assistant, m-commerce device, any suitable type of equipment or location associated with a wirelessly detectable tag (e.g., a kiosk, news stand, restroom), and telephone. The invention contemplates employment of at least RFID (Radio Frequency Identification) technology, UWB (Ultrawideband) systems, Wi-Fi® and Bluetooth® wireless technologies, separately or in combination, in addition to other wireless technologies. That is, the network implemented may accommodate only Bluetooth devices, or a network may be implemented to accommodate a plurality of different wireless/wired technologies. Thus, the communication can be a predefined structure as with conventional networks or simply an ad hoc communication between at least two devices.

Wi-Fi, or Wireless Fidelity, allows connection to the Internet from a couch at home, a bed in a hotel room or a conference room at work, without wires. Wi-Fi is a wireless technology that enables devices, e.g., computers, to send and receive data indoors and out; almost anywhere within range of a base station. Note, however, that Wi-Fi can be used in ad hoc mode with a device other than access point (here, denoted as the base station). Wi-Fi networks use radio technologies (IEEE 802.11 (a, b, g, etc.)) to provide secure, reliable, fast wireless connectivity. A Wi-Fi network can be used to connect computers to each other, to the Internet, and to wired networks (which typically employ IEEE 802.3 or Ethernet). Wi-Fi networks typically operate in the unlicensed 2.4 and 5 GHz radio bands, with an 11 Mbps (802.11b) or 54 Mbps (802.11a) data rate or with products that contain both bands (dual band), so the networks can provide real-world performance similar to basic 10BaseT wired Ethernet networks used in many offices. Of course, wireless systems utilizing even higher bit rates and/or frequencies may be used in accordance with the present invention.

The disclosed architecture can also be used with HiperLAN technology. HiperLAN is a set of wireless local area network (WLAN) communication standards primarily used in European countries. There are two specifications: HiperLAN/1 and HiperLAN/2, both of which have been adopted by the European Telecommunications Standards Institute (ETSI). The HiperLAN standards provide features and capabilities similar to those of the IEEE 802.11 WLAN standards used in the U.S. and other adopting countries. HiperLAN/1 provides communications at up to 20 Mbps in the 5-GHz range of the radio frequency spectrum. HiperLAN/2 operates at up to 54 Mbps in the same RF band, and is compatible with 3G (third-generation) WLAN systems for sending and receiving data, images, and voice communications. HiperLAN/2 has the potential, and is intended, for implementation worldwide in conjunction with similar systems in the 5-GHz RF band.

HomeRF® is just one other example of a many other wireless technologies that can benefit from the disclosed architecture.

With such capabilities, a user of the invention can access a portable system that can detect entity location relative to the user and present directional information to the user such that the user can navigate to the desired entity. Detection can be accomplished by any number of conventional means, for example, triangulation with two antennas, Doppler shift with one antenna, etc.

Figure 2:
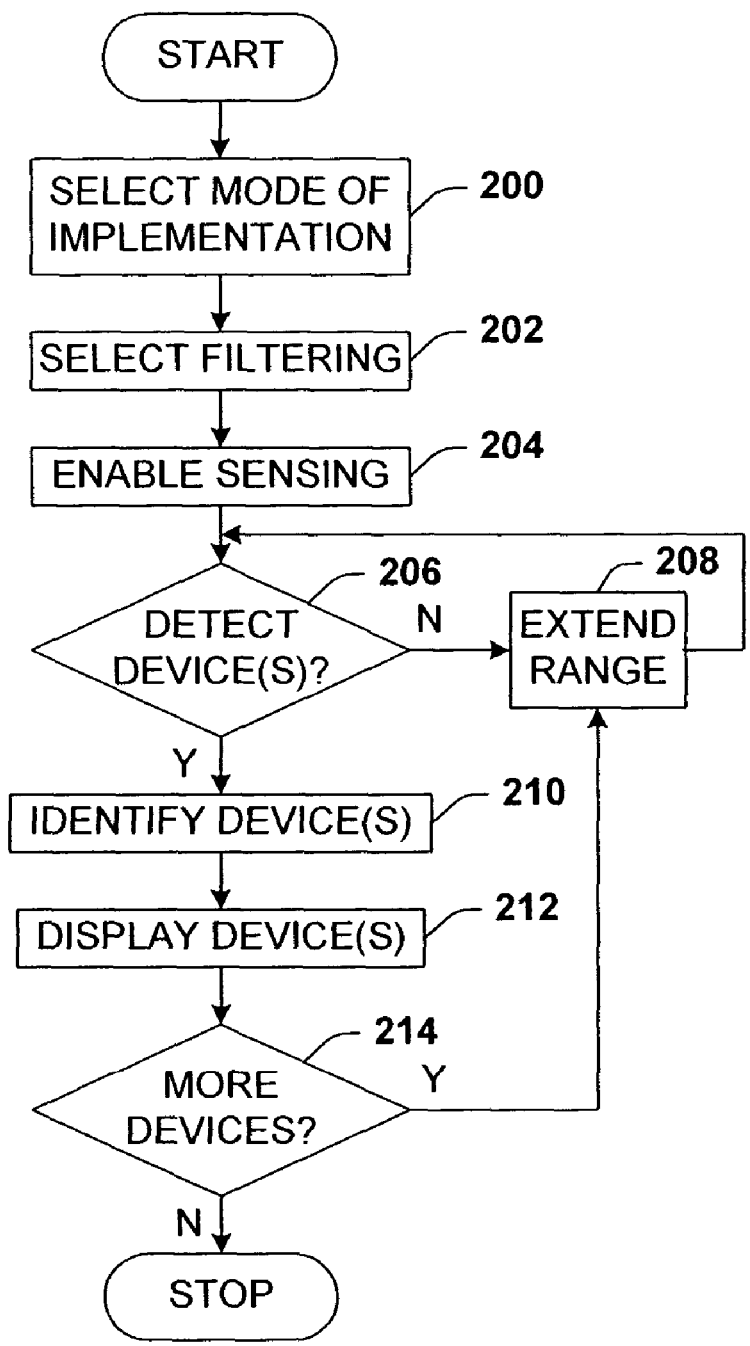
FIG. 2 illustrates a flow chart of the process for detecting and presenting the devices, in accordance with the present invention.

Referring now to FIG. 2, there is illustrated a flow diagram of a process for detecting and presenting the devices, in accordance with the present invention. While, for purposes of simplicity of explanation, the one or more methodologies shown herein, e.g., in the form of a flow chart, are shown and described as a series of acts, it is to be understood and appreciated that the present invention is not limited by the order of acts, as some acts may, in accordance with the present invention, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the present invention.

At 200, a user selects a mode of implementation of the subject invention. This includes whether the invention is used in a portable terminal device, a stationary computer, or other implementation described in greater detail hereinbelow. At 202, filtering is selected. This includes selecting detection in a single plane in 2-D space, or in 3-D space. If in 3-D space, the user can choose to detect substantially all devices within a given radius of the system. Filtering can be selected in a directional format such that a subset of devices in a hemisphere, quadrant, or other volume of space can be detected. After selecting the filtering mode, at 204, the user enables the sensing or detecting process. This, for example, can be performed by manually pressing a button, or automatically after a short duration of time.

At 206, it is determined if a device has been detected. If NO, at 208, sensing range is extended. This can occur automatically or manually until a predetermined limit is reached or signal received back. For example, if the invention is employed in a portable device, the range can be extended to cover an approximate area of a room between the device and a furthest wall or side walls of the room. The sensing range can be extended until either a predetermined limit is reached or a device is found. Flow is then back to the input of 206 to again determine if a device has been detected.

If YES, a device has been detected, at 210, the device is identified. This can include determining if the detected device(s) is a printer, copier, computer, etc. At 212, a graphical representation of the detected devices is presented to the user. Of course, the invention can also display information to inform the user that a device has or has not been detected. Thus in one mode, the user can control the invention to provide an alert that devices have been detected, after which the user can select a mode to present a 2-D and/or 3-D representation thereof. Alternatively, the invention can automatically display a representation of all detected devices upon detection.

At 214, it is determined if more devices are to be detected. That is, if the user operates the invention to display a few devices, and chooses to have a lesser or greater number of devices presented, the range can be modified to facilitate display of the additional devices. Thus, at 214, if the user desires to display more devices, flow proceeds to 208 to extend sensing range. Alternatively, if the user chooses to not display any more devices, flow is from 214 to a Stop block.

Figure 3A:
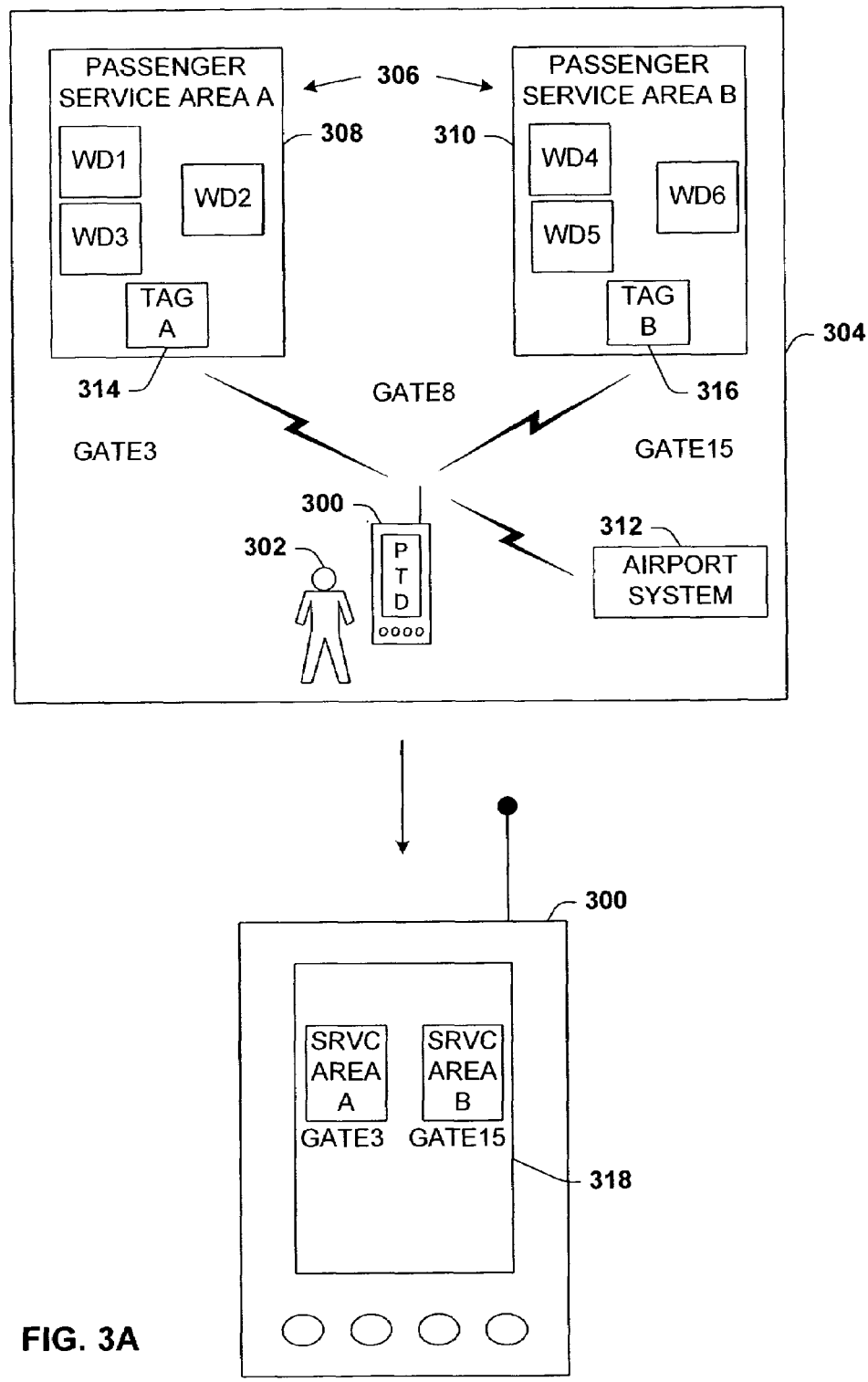
FIG. 3A illustrates a diagram of an airport implementation of the present invention using a portable terminal device.

Referring now to FIG. 3A, there is illustrated a diagram of an airport implementation of the present invention using a portable terminal device (PTD) 300. When a user 302 of the PTD 300 enters the airport terminal 304, the PTD 300 can be used to detect service areas 306 provided by the airport. The user 302 can operate the PTD 300 to sense a first service area (also denoted PASSENGER SERVICE AREA A) 308 and a second service area (also denoted PASSENGER SERVICE AREA B) 310. The services areas 306 include a number of wireless devices that can be used by the user 302 (denoted WD1, WD2, WD3, WD4, WD5, and WD6) for printing, accessing the Internet, making copies, scanning documents, etc. However, if the user 302 is a distance from the areas 306 such that the PTD 300 cannot sense the associated devices, the user at least needs to be directed to the area locations.

Since such airport areas may be spaced apart by significant distances, an airport system 312 may be suitably implemented to transmit a map of the areas 306 located throughout the airport to the PTD 300. Thus the airport system 312 can use the architecture of the present invention to detect location of one or more PTDs 300 and transmit thereto information related to the nearest service areas 306. This information may be a gate number that is used to locate an area in an airport.

Alternatively, the PTD can detect a service area location tag from which to obtain the location of the service area. Thus the first service area 308 has associated therewith a first tag (also denoted TAG A) 314 and second service area 310 has associated therewith a second tag (also denoted TAG B) 316, which when pulsed, emits tag location information that may be presented to the user 302. If the user PTD 300 is at, for example, gate eight, the tag location information received by the PTD 300 can be the gate numbers associated with the nearest service areas 306, which are gates three and fifteen. In accordance with the present invention, the tag locations can then be presented graphically or in a tabular format on a display 318 of the PTD 300 as GATE3 and GATE15.

In a more robust implementation, the user 302 can signal the airport system 312 via the PTD 300 for the device or port needed. The airport system can then select the nearest service area 306 that has the device or port available. Still further, the airport system can reserve the device or port for the user 302 within a specific time of arrival. That is, if the user 302 deplanes, and the PTD 300 displays in 2-D or 3-D all available service areas 306, as described above, the user 302 can further request a specific device, in response to which the airport system directs the user 302 to the corresponding service area having the requested device or port. The user 302 would be allowed to reserve the device or port for only a few minutes associated with the time to arrive at the device or port from the first detected location of the PTD 300 by the airport system. Otherwise, the device or port is made available for others to use. Of course, the airport system 312 would calculate the reservation time based upon the location of the detected PTD 300. For example, if the user 302 was two floors away, that distance would need to be considered in determining the reservation time.

The airport system 312, operable in accordance with the present invention, can also "learn" or classify user behavior according to usage of such devices and/or ports, and as a result, operate accordingly. The subject invention (e.g., in connection with anticipating device and/or port availability) can employ various artificial intelligence based schemes for carrying out various aspects of the subject invention. For example, a process for determining which devices to display to the user can be facilitated via an automatic classification system and process. That is, when the user 302 decides to find available devices/ports, the classifier can determine which to display based upon actual availability and expected availability. As the airport system 312 operates over time, trends can be developed for the average time used per device/port, and further criteria can be considered, such as the time of day, day of the week, etc. Based upon such information, the airport system 312 can signal the PTD 300 to display only those devices/ports that are available or will become available within a predetermined duration of time. Of course, when the user 302 activates the PTD 300 to detect the devices/ports, the PTD 300 can signal the airport system 312 for authentication or a basic identification process, in response to which the airport system 312 reacts to the requested information. It is to be appreciated that although this description focuses on an airport, it is intended to apply to any system in any location that can supplement or enhance the functionality of the detection and presentation features of the present invention by intercommunicating with the PTD 300 to provide a more beneficial use to the user 302. This feature facilitates reducing the loss of utility of the disclosed detection architecture by presenting to the user 302 only those devices/ports that are available for use or that will become available shortly, and not those devices/ports that are not available. Alternatively, all devices/ports can be displayed, but those that are currently in use will have a different color, with variations in color indicating predicted availability based upon past data (e.g., a blinking graphic).

Such classification can employ a probabilistic and/or statistical-based analysis (e.g., factoring into the analysis utilities and costs) to prognose or infer an action that a user desires to be automatically performed. A classifier is a function that maps an input attribute vector, x=(x1, x2, x3, x4, xn), to a confidence that the input belongs to a class—that is, f(x) =confidence(class). In the case of device detection and presentation systems, for example, attributes are utilization times derived from the past usage of the devices and/or ports, and the classes are types of devices.

For example, a support vector machine (SVM) classifier can be employed. An SVM operates by finding a dynamically changing hypersurface in the space of possible inputs. This hypersurface will facilitate presenting the devices/ports by attempting to define the time at which a given device/port will become available, where such criteria is used, based upon past input (or usage) data. Other directed and undirected models classification approaches include, e.g., naïve Bayes, Bayesian networks, decision trees, and probabilistic classification models providing different patterns of independence can be employed. Classification as used herein also is inclusive of statistical regression that is utilized to develop models of priority.

As will be readily appreciated from the subject specification, the subject invention can employ classifiers that are explicitly trained (e.g., via a generic training data) as well as implicitly trained (e.g., via observing user behavior, receiving extrinsic information) so that the classifier(s) is used to automatically determine according to a predetermined criteria which devices/ports to display according to traffic in the service areas (in the airport example) and devices/ports that are more heavily used. The criteria can include, but is not limited to, the type of device, type of port, location of the device or port, and usage of the devices or ports. For example, with respect to SVM's which are well understood, SVM's are configured via a learning or training phase within a classifier constructor and feature selection module.

The disclosed architecture can also consider other factors in facilitating device discovery and presentation. A look-up table of barrier materials can be used to properly adjust the signal strength for sensing the detectable entities. For example, where the user may be attempting to detect entities through a wall, the table can include typical wall materials (e.g., wall board, paneling, sheet rock, lumber, steel . . . ) that impact whether the signal strength should be increased to enhance delectability of the enclosed entities.

The disclosed architecture is operable to sense the presence of the barrier, and thus react according to user requirements. For example, the user can control the detection and presentation system to sense and display only those devices within a first barrier. This is determinable based upon the signal strength, and properties of materials that impact the signal strength. Thus, if the user desires to detect all devices in a rectangular shaped room, the walls are the barriers such that all devices detectable beyond the walls will be filtered out based upon the strength (or weakness) of the received signals. The system will then auto-range the detection component signal to sense those devices within the barrier. This feature is particularly useful in an airplane environment where the shape of the volume to be sensed is primarily a long rectangular volume. Thus the distance to the sides of the seating area, for example, is very short while the distance to the back seats of the plane is relatively very long. Of course, in accordance with the present invention, wireless devices operating inside luggage (or crates) in the luggage compartment (or cargo hold) can also be sensed provided the appropriate barrier materials are used for filtering and selecting the required signal strengths.

Still further, where the entities to be detected are inline with a radius from the device 300 (i.e., along a line-of-sight (LOS)), discrimination of the entities when proximately located along the LOS is more difficult (e.g., in an airplane seating arrangement, or office or conference room environments). Thus several calculations need to be performed along with filtering to distinguish the entities for presentation.

The airport system 312 (other similarly implemented system of the present invention) can determine the velocity and heading of the PTD 300 (and user 302) by simply making repeated measurements of the PTD location. Thus, in an alternative implementation of the present invention, while the application of the present invention employed in the PTD 300 can be used to detect and present the location of entities to the user 302, implementation of the present invention in the airport system 312 can be for tracking the location and movements of all users of activated PTDs throughout a given location. Of course, the airport system 312 would then display the locations of the PTDs as the PTDs move throughout an area.

Figure 3B:
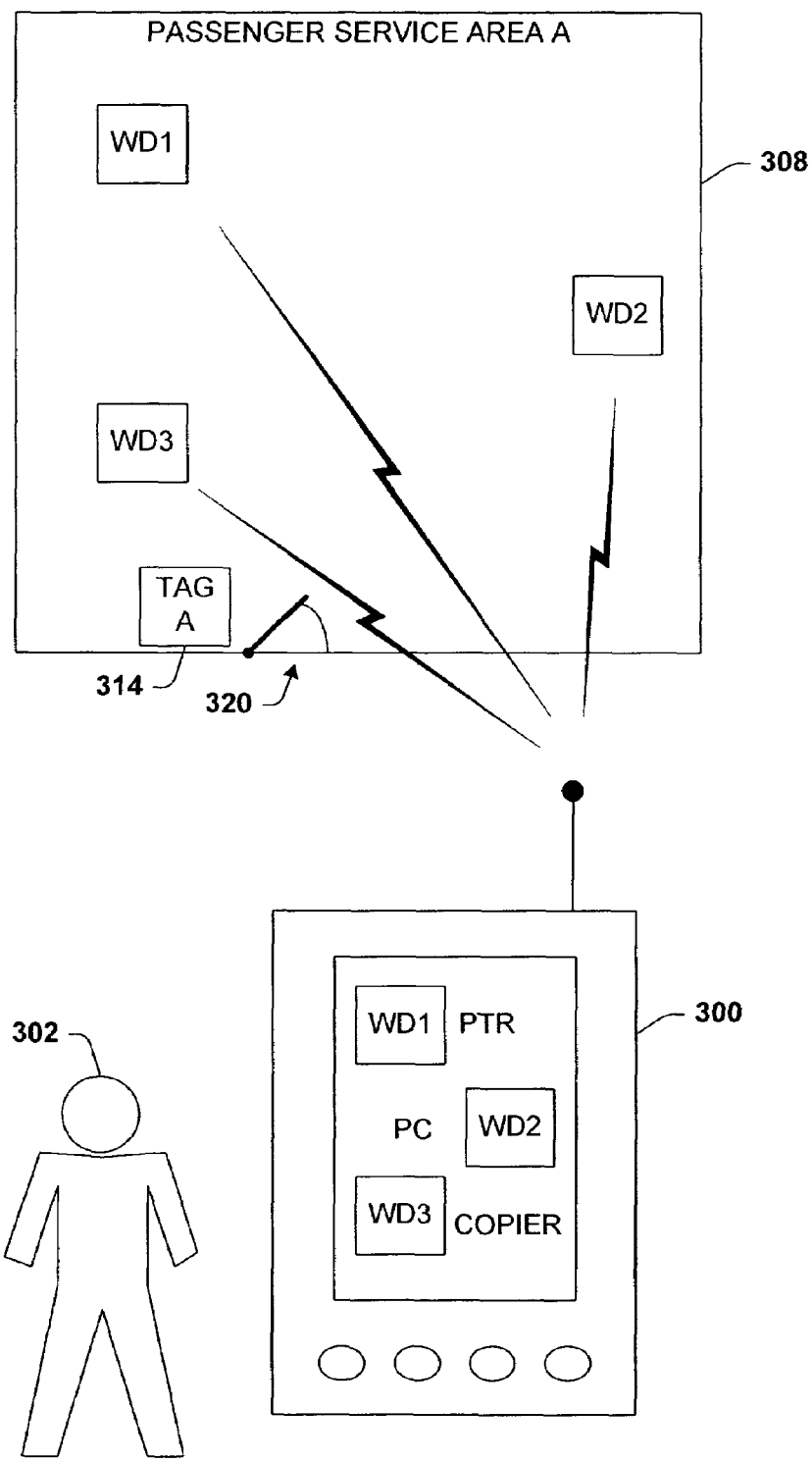
FIG. 3B illustrates a diagram of a service area device discovery process of the airport implementation of FIG. 3A.

Referring now to FIG. 3B, there is illustrated a diagram of a service area device discovery process of the airport implementation of FIG. 3A. Once the user 302 has been notified of a service area, the user navigates to the service area, for example, service area 308, and uses the PTD 300 to detect the devices located therein. When detected, the PTD 300 displays the approximate spatial relationship of the devices via the display 318 such that the user can quickly go to the location of the device he or she wishes to use. Moreover, presentation of such devices also allows the user to determine if the service is even available, since the device may not be available in the area 308. In this particular illustration, three devices are shown to be detected in the area 308, a printer (WD1), PC (WD2), and copier (WD3). The PTD 300 displays to the user 302 not only the spatial information, but also a device description. Since the display area may be significantly smaller than the physical layout of the devices in the area 308, the disclosed novel architecture scales the device locations as closely as is practicable, to the display area. That is, device WD1 is the farthest from the PTD 300 and to on the left side, device WD2 is next closest but to the right and forward of WD1, and device WD3 is the closest to the PTD 300 to the left and forward of WD2. This substantially planar and spatial relationship is maintained during display of the device information.

Note also that for users who may use legacy systems or systems that connect to the network via a hardwired connection, such systems may be proxied into the system of the subject invention by way of the airport system 312 or other system(s) capable of such purposes. The user may then be presented with the multi-dimensional display of all available devices within an area or given range of a wireless device associated with the proxy system. The proxy method facilitates the presentation of wireless devices of any or all areas of the airport the user desires to perceive.

Since some users may not be comfortable with the "animated" presentation of the devices on the display, that is, as the PTD 300 moves relative to the displayed devices, the displayed devices are adjusted accordingly, the user 302 can choose to reference the detected devices relative to a fixed point. For example, as the user approaches and enters the service area 308, the user 302 can select that all detected devices be displayed on the PTD 300 relative to a front door 320 (where the tag 314 may be physically located). This can facilitate finding the device more readily for some users.

It is appreciated that the PTD 300 can be employed to detect moving entities. For example, if a user enters a store, the PTD 300 can be used to ascertain and display the location of a tagged assistant such that the user 302 can readily find the assistant. Thus the disclosed architecture is operable where both the detection system and the detected entities are capable of movement.

Figure 4:
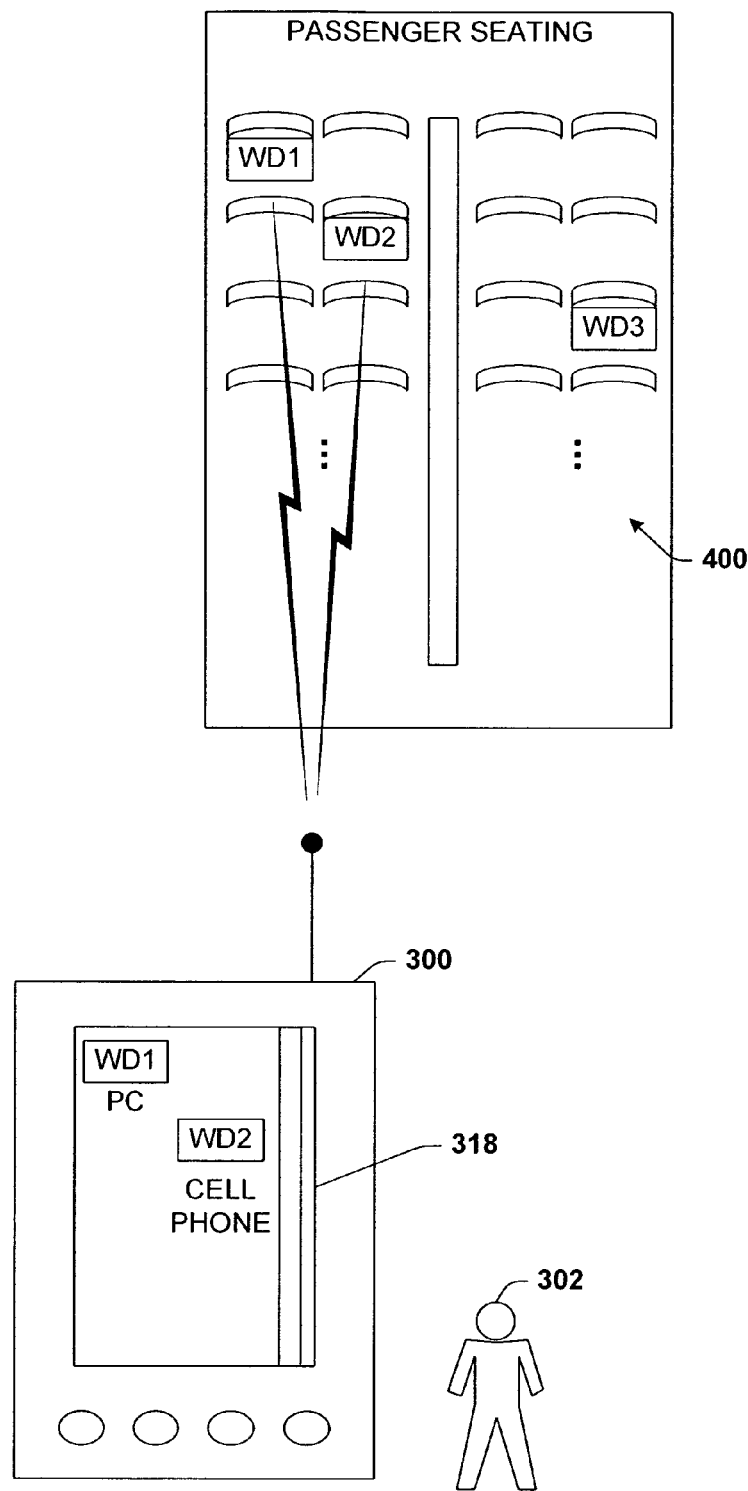
FIG. 4 illustrates a block diagram of an airplane implementation of the present invention.

Referring now to FIG. 4, there is illustrated a block diagram of an airplane implementation of the present invention. The detection and presentation architecture of the present invention can also be used to detect wireless devices that are operational before takeoff and landing of an airplane. Thus the user 302, who in this case can be a flight attendant, operates the PTD 300 (which may not need to be a portable device, but can also be a fixed system that the attendant operates) to detect what and where the operational devices are located in an airplane seating area 400. In this illustration, the attendant 302 has detected that devices WD1 and WD2 are operational, while device WD3 is not. This is represented by the operational devices (WD1 and WD2) being displayed via the display 318 of the PTD 300 and a corresponding brief description of the devices (respectively, PC and CELL PHONE). Note that the spatial relationship is generally maintained to facilitate the attendant 302 finding the device users. That is, device WD1 is farthest away with device WD2 closer and to the right thereof.

Figure 5:
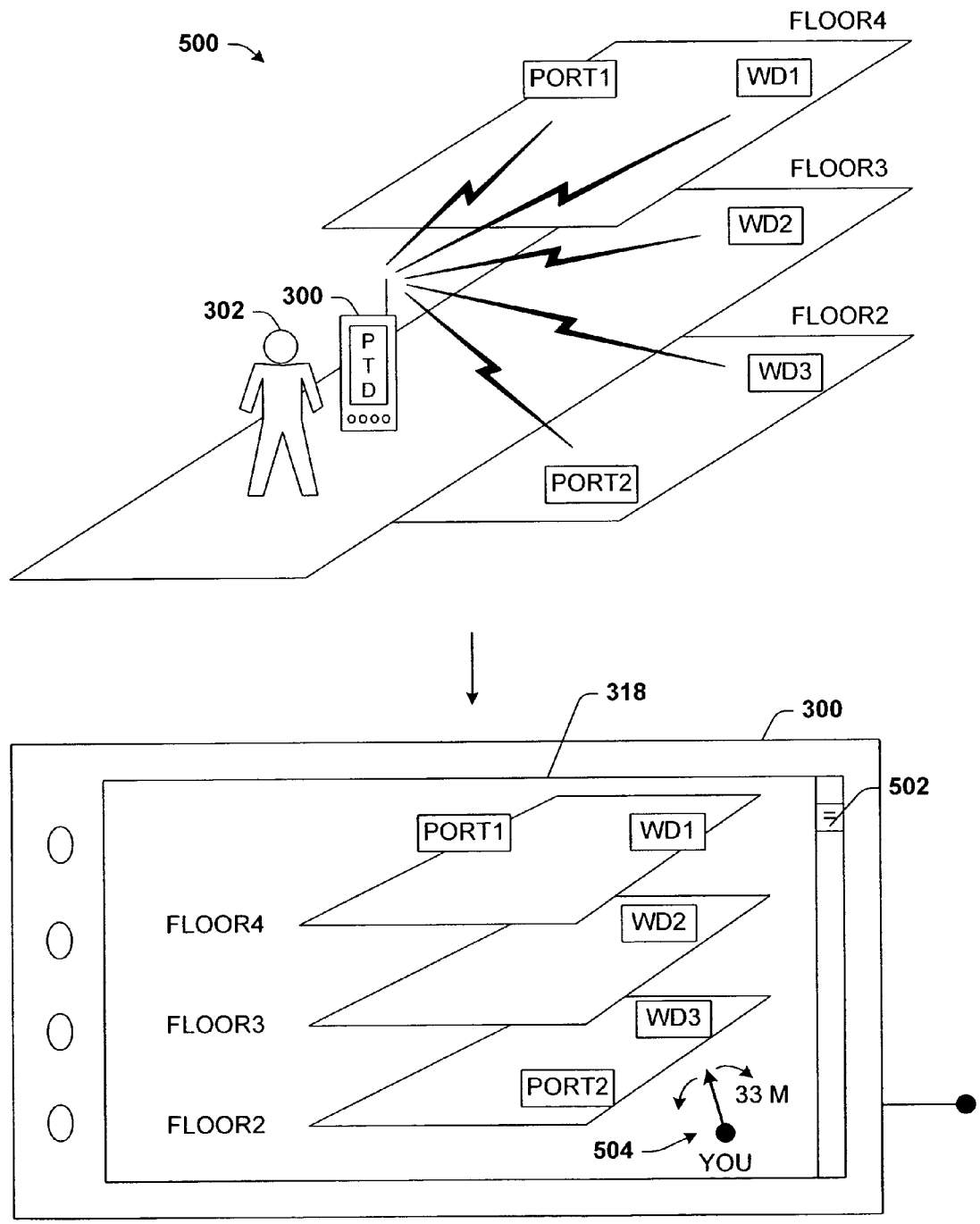
FIG. 5 illustrates a block diagram of a multi-floor 3-D application of the present invention.

Referring now to FIG. 5, there is illustrated a block diagram of a multi-floor 3-D application 500 of the present invention. Here, the user 302 uses the PTD 300 to detect devices within a 3-D radius, such that device WD1 on a floor above (FLOOR4), device WD2 on the present floor (FLOOR3), and device WD3 on a floor below (FLOOR2) will be detected and presented. Thus if the user 302 determines that a device he or she wishes to use is not on the present floor (i.e., FLOOR3), the signal strength setting can be increased to scan a wider range to detects devices on other floors.

When detected, the PTD 300 presents the 3-D information to the user in a 3-D representation via the display 318. Note the disclosed architecture is operable to automatically orient the displayed data in the most viewable manner, such as in a portrait or landscape format. Here the graphics are presented in a landscape format with a scroll bar 502 for scrolling the window up or down. In this implementation, the PTD 300 may not have the floor plan stored therein, thus the floor plan will be transmitted to the PTD 300 for use in presenting the devices thereon. Optionally, the PTD 300 may use analytical results on the radio waves characteristics to dynamically determine the approximate location of walls, floors, and other barriers within the present space. Note also that wireless devices are not necessarily the only item of interest to the user 302. For example, in a library or other facility where not all services are provided wirelessly, the user 302 may be interested in finding available network ports. Thus each wired network port can be identified with a tag such that the user can go to the port and plug into the port. Here, two ports, PORT1 and PORT2, are tagged for identification on respectively, FLOOR4 and FLOOR2.

Again, the 3-D spatial orientation and relationships of the devices and ports are maintained for display to the user 302. Thus the user 302 can ascertain depth and lateral spatial features via the display 318. In more robust implementations, the display 318 presents features that facilitates zoom-in and zoom-out of the window to provide greater detail as to where the device and/or port is located. Additionally, the presentation component can use colors to differentiate relative depth of the devices and ports. In support thereof, the FLOOR4 device and port graphics can be different colors to represent that WD1 is farther away from the PTD 300 than PORT1.

Another feature of the present invention that is described in greater detail below, is that when the user 302 walks with the PTD 300 laterally, the PTD 300 will sense the change in position of the devices and ports relative to the PTD 300, and display the orientation of the associated display graphics accordingly.

Alternatively or in combination with the features previously described, the display component can be suitably designed to present a location vector 504 on the display 318 that indicates both direction and approximate distance (here, 33 meters) of a selected device, e.g., device WD2. Thus the user not only can be presented with the multi-dimensional graphical and textual representation of the detected devices over multiple floors, but can also assign the location vector 504 to the WD2 device to facilitate finding the device WD2. The user can assign the vector 504 by selecting both the vector 504 and the device WD2 via, perhaps, voice control, a keyboard, and/or a light pen or stylus. As the user moves the PTD 300 by walking, the vector arrow points to the general location of the WD2 device and provides the dynamically updating distance and direction from the PTD 300.

Figure 8:
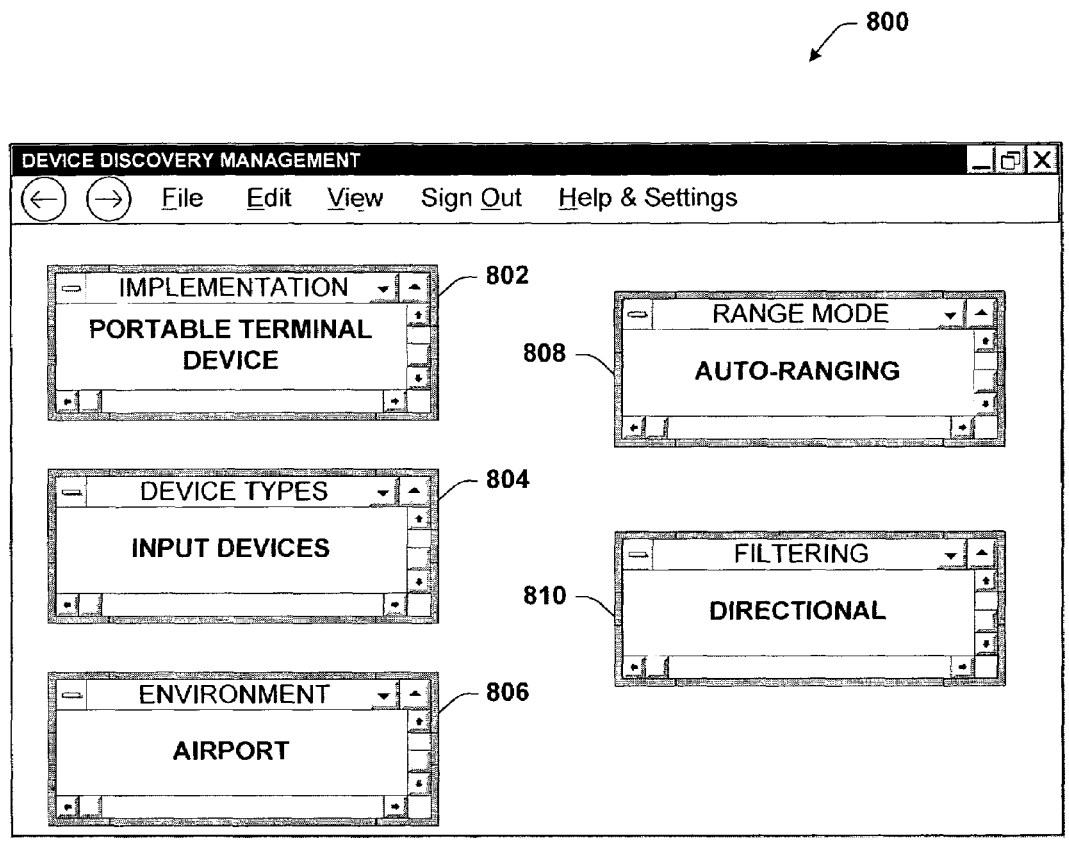
FIG. 8 illustrates an interface management screen of the present invention for configuring the sensing and presentation architecture.

The disclosed architecture includes a graphical user interface that is presented via the display 318 that facilitates the discovery and display of wireless devices. The interface includes an input component for processing management information. The management information is associated with at least one of configuring the PTD 300 and detecting the device locations. The interface also includes a presentation component for presenting a 2-D or 3-D representation of the locations of one or more of the detected devices based upon the management information. In the interface of FIG. 8, a webpage format is presented to allow the user to configure at least one of an implementation, device type, environment, sensing range mode, ands filter criteria. This is described in greater detail hereinbelow.

The interface further comprises a mapping feature that maps a representative device location in space relative to other detected devices. Thus where the WD2 device is detected above the WD3 device, the corresponding spatial relationship is preserved for presentation to the user. As indicated previously, the interface includes a presentation component that provides a graphical representation of a location vector for indicating a direction and distance of the computer from a detected device. A mapping feature of the interface automatically maps device location information according to predetermined spatial criteria. That is, the user can scale the graphics to include more or fewer detected devices. Furthermore, each of the detected and displayed device locations are selectable. By selecting a device location, the user can be presented with further information about the device, such as make, model, etc. The mapping feature can be configured to draw a general 2-D or 3-D representation of a floor layout of individual device location graphics, wherein the graphics are selectable. The presentation component further comprises means for selecting a floor in the building and means for selecting one of the device locations. Thus where the user chooses to look more closely at a specific floor, only that floor can be selected for an enhanced close-up view. The interface further includes graphical means to display a color and/or a pattern corresponding to user preference information.

Note that in more robust implementations, the PTD 300 can download a map of an area for presentation of the device superimposed thereon. This can occur in addition to or in lieu of dynamically generating the map. For example, if the user is on a first floor and detects a device on the third floor, the user can further download a map that generally matches the layout and features of the environment in which the user is present. This map download can occur automatically and is transparent to the user. Once the map is no longer needed, it can be deleted, manually or automatically according to predetermined criteria (e.g., signal strength, heading of the PTD, aging parameters, . . . ). That is, the map can show walls, hallways, stairs, etc., that generally match building or room features where the user is currently standing, and where the user will need to go to get to the device. As the user moves in the direction of the device, as directed by the location vector 504, or by other means, the map presented by the PTD 300 moves through the virtual hallways, stairs, etc., to aid the user in navigating to the device. Thus, the user can quickly and easily navigate to the desired device location. The disclosed architecture is capable of generating one or maps in the background (transparent to the user) as the user moves the PTD throughout an environment. That is, as the user navigates one map, another may be generated for use for eventual presentation, the map being a different rendition of the existing map such that the user can manually or automatically switch between them during navigation. For example, as the user views one map, which map may be a more graphical robust representation, a wire frame map may be developed and tracked in the background (or in the foreground next to the robust map) such that of the user chooses to view the wire frame version, this may be accommodated by the simple press of a button, or invoking of a voice command.

Figure 6:
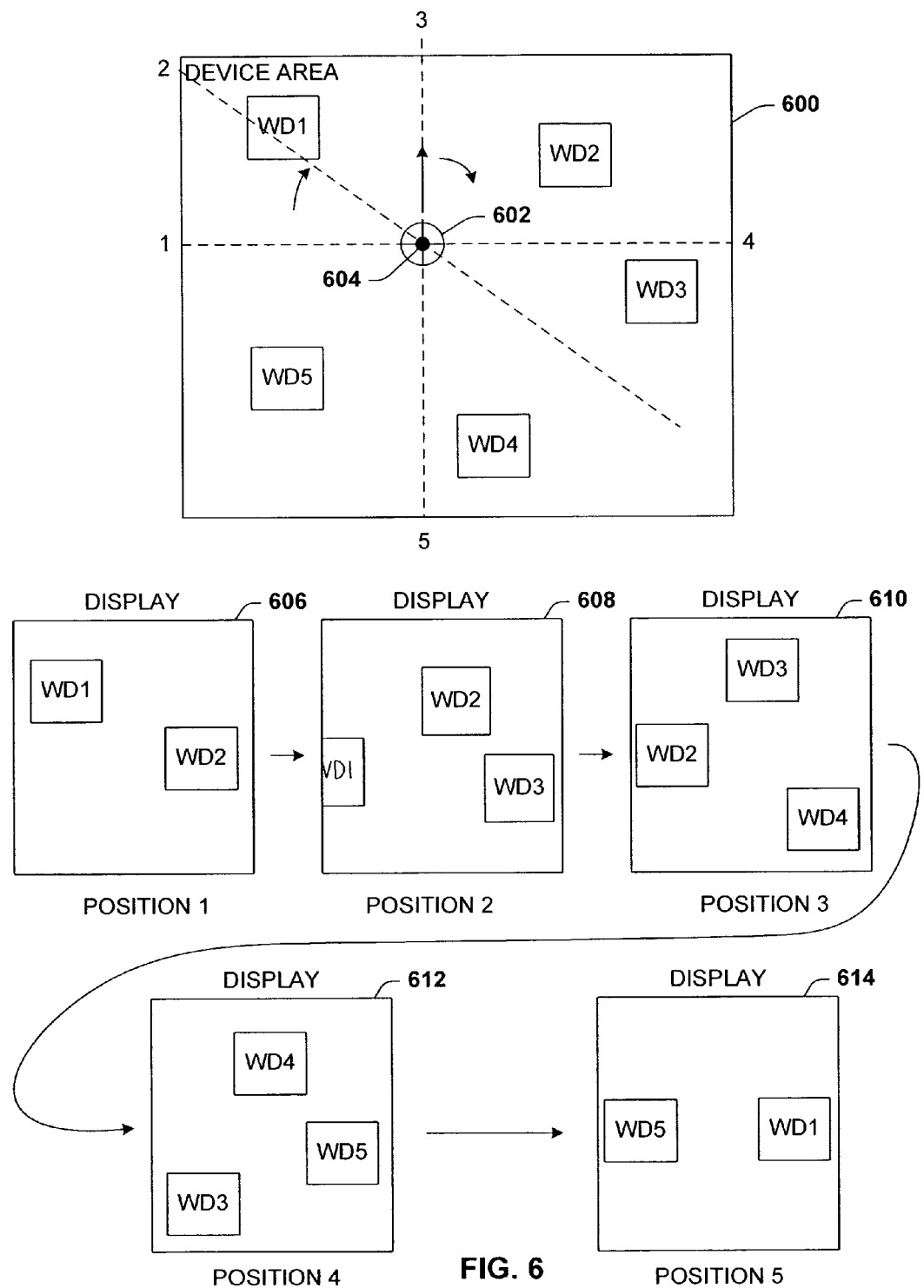
FIG. 6 illustrates a device area in which a portable terminal device is rotated about a fixed point to sense and display devices in accordance with the present invention.

Referring now to FIG. 6, there is illustrated a device area 600 in which a PTD 602 (similar to PTD 300) is rotated about a fixed point 604 to sense and display devices in accordance with the present invention. The device area 600 is provided with a plurality of devices WD1, WD2, WD3, WD4, and WD5 dispersed within the area 600. Discussion begins with the PTD 602 oriented to detect and display devices above a 1-4 line, a 180-degree span, and rotating the PTD 602 clockwise. The corresponding displays are shown therebelow.

In the first position (1), the PTD 602 senses and displays two devices, WD1 and WD2. The corresponding display 606 illustrates that the representative graphics for WD1 and WD2 are oriented spatially as indicated.

In a second position (2), the PTD 602 is in rotation clockwise on the way to the 90-degree position (also associated with position (3)) to detect and ultimately display devices WD2, WD3, and WD4. Note, however, that as the PTD 300 is rotated past device WD 1, the display 608 will sense and track the relative device positions during movement such that device WD 1 is shown moving out of the display area. When rotation reaches the third position (3), the PTD 602 is in the 90-degree position, and the corresponding graphics are as in display 610.

In a fourth (or 180-degree) position (4), the PTD 602 senses and displays the devices WD3, WD4, and WD5, as illustrated in display 612. Of course, the user will also see device WD2 transition out of the display area and device WD5 transition into the display area as rotation continues from position 3 to position 4.

In a fifth (or 270-degree) position (5), the PTD 602 senses and displays devices WD5 and WD1. Thus, the user will see device WD3 and WD4 transition out of the display area and devices WD1 move into the display area at the PRD 602 rotates.

Note that the disclosed architecture is operable to display a full 360-degree representation of the detected devices (similar to the illustrated area 600) such that the fixed point 604 is in the center of the display area and scroll bars are provided such that the user can scroll up/down, left/right to view all detected devices WD1, WD2, WD3, WD4, and WD5 in a 2-D or 3-D presentation.

Figure 7:
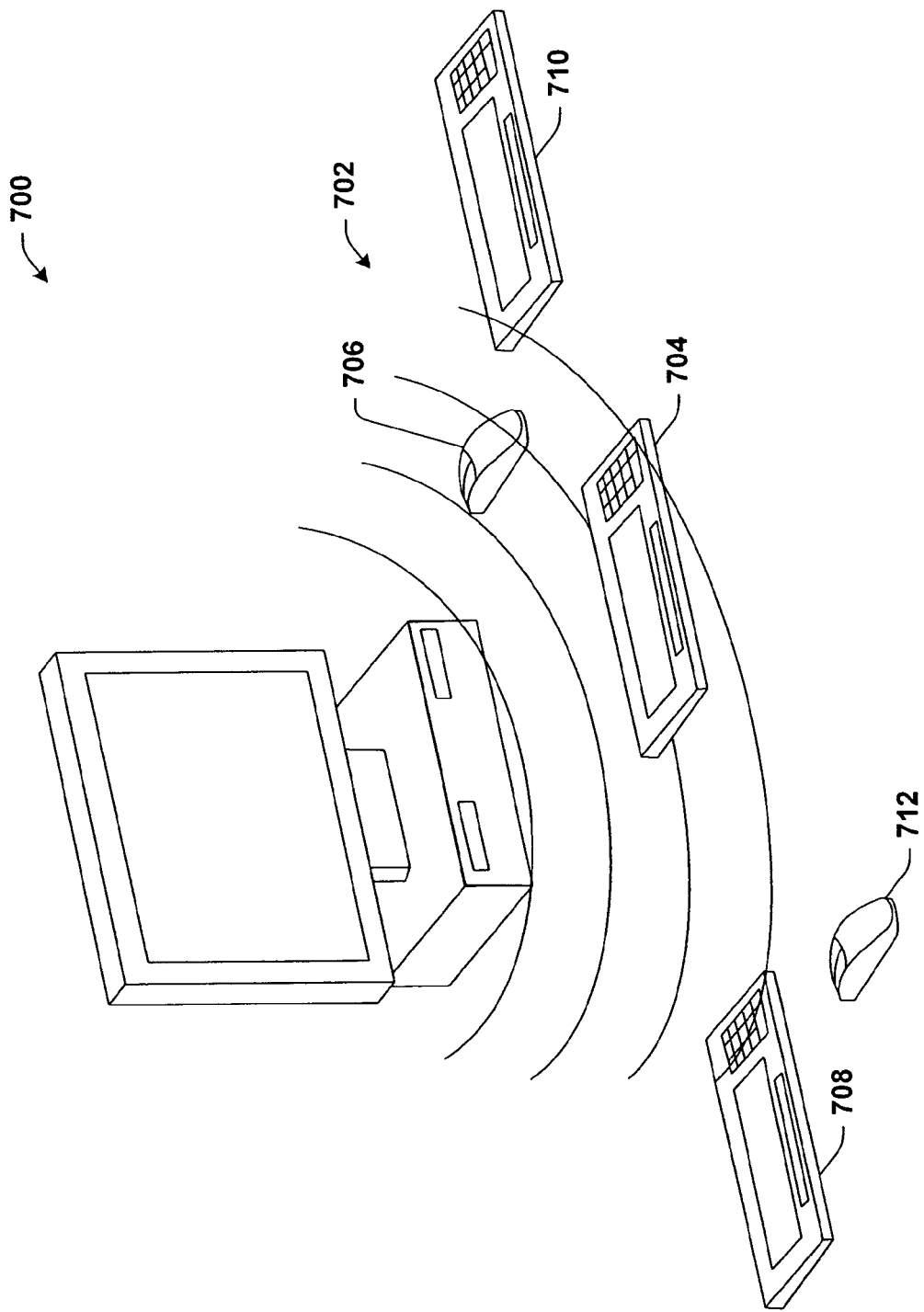
FIG. 7 illustrates an application of the disclosed architecture to a computer system for detecting proximately positioned wireless input devices.

Referring now to FIG. 7, there is illustrated an application of the disclosed architecture to a computer system 700 for detecting one or more proximately positioned wireless input devices 702. The system 700 automatically starts with a short-range detection process, and increases the sensing range until the first wireless input device is detected. It is appreciated that the user can control the sensing architecture to "look" for only certain types of input device, e.g., a keyboard versus a mouse. This is an energy conservation feature such that the sensing signal strength is slowly increased from lower powered signal strength to a higher-powered signal until the device is sensed. The scaling from a lower power to a higher power signal represents a sphere of increasing radius until a device is detected. However, as indicated hereinabove, a filtering component may be utilized to provide a more directional aspect such that the sensing signal is directed to the a hemisphere or even a quadrant in front of the computer system 700, a volume that typically envelops the location of such devices. Here, the system 700 senses a keyboard 704 and a mouse 706 before detecting more distant keyboards (708 and 710) and mouse 712.

Alternatively, the architecture can be configured to scan a fixed distance in front of the computer system 700, which fixed distance includes the volume in space where such input devices are typically positioned. That is, a keyboard can typically be found in front of the computer chassis (for a desktop unit) or upward and a short distance away (for a floor-based tower chassis). For a mouse, the location is in front and slightly to the left or right of the desktop chassis. Of course, the architecture can be encased as a standalone unit in a chassis separate from the portable terminal, desktop, tower, or portable computer chassis such that the standalone unit is operable to communicate with the computer system 700 via a USB connection or other communication port. Thus, the unit can be positioned to detect the location of the input devices at locations that are typical for such implementations, e.g., in front of the user.

Referring now to FIG. 8, there is illustrated an interface management screen 800 of the present invention for configuring the sensing and presentation architecture. Illustrated are but a few of the many control features that can be used to facilitate use of the disclosed architecture. For example, there is an Implementation subwindow 802 for selecting that type of environment employed. This includes, but is not limited to, a portable terminal device, a relatively stationary computer, etc. A Devices subwindow 804 is provided for selecting the types of devices to be sensed. This includes, but is not limited to, input devices (such as keyboards and mice, trackballs, etc.), peripheral devices (e.g., printers, copiers, cellular telephones, scanners, kiosks,), computers, access points, and many other wireless devices suitable for detection.

The interface 800 also includes an Environment subwindow 806 for allowing selecting of the environment in which the sensing is taking place. This may include a large area (e.g., airport terminal, library, multi-floor areas . . . ), medium area (e.g., office areas and airplane seating area) or small area (single office or adjacent (or proximately located) offices).

The interface 800 also includes a Range Mode subwindow 808 for allowing the user to select a fixed range of detection, auto-ranging, auto-ranging to first detected device, range to multiple floors, a single floor, etc.

The interface 800 also includes a Filtering subwindow 810 for allowing the user to select the type of envelope to sense, e.g., directional in one plane (i.e., 2-D), full 360-degree spherical range, quadrant, hemisphere, etc.

Figure 9:
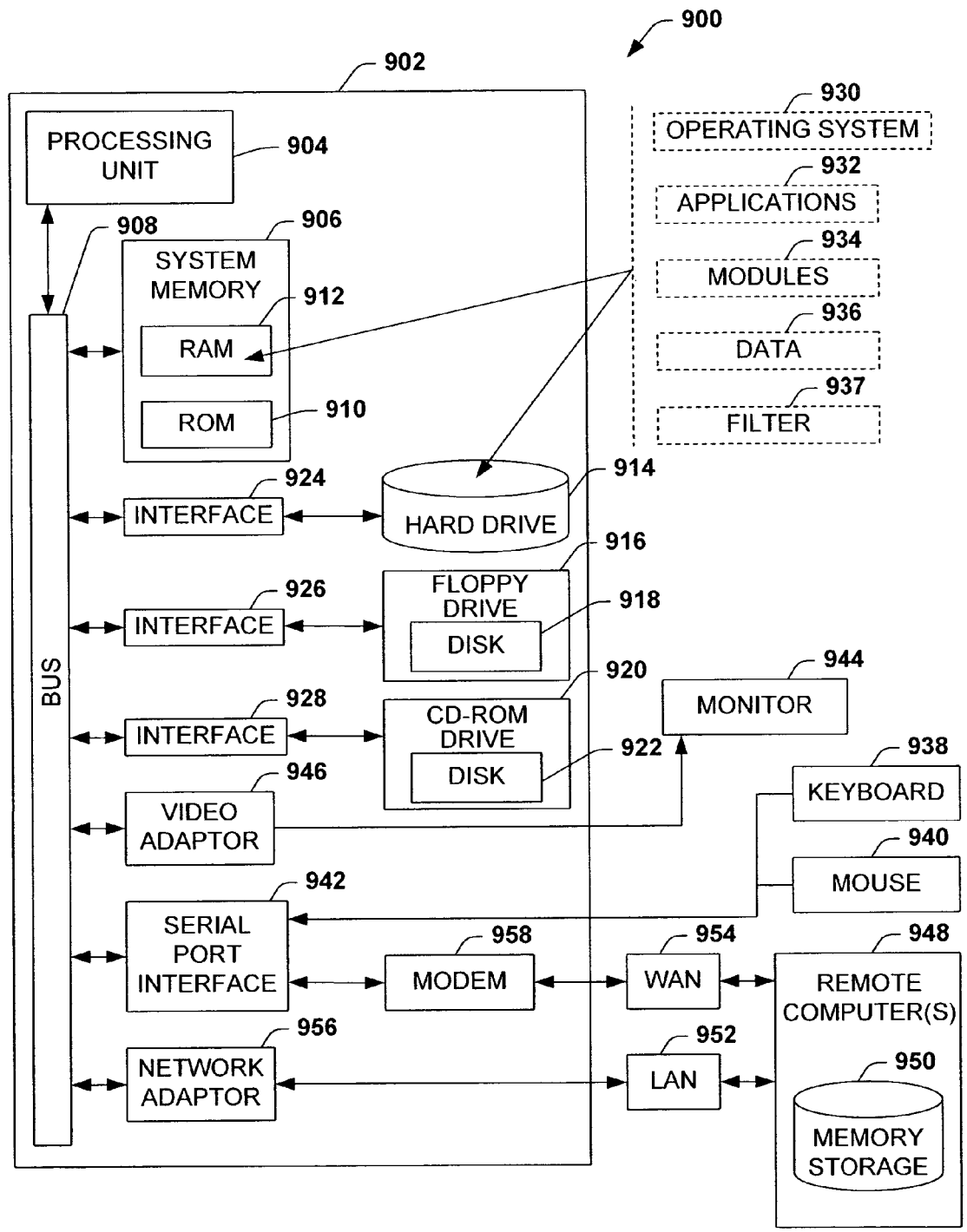
FIG. 9 illustrates a block diagram of a computer operable to execute the disclosed architecture.

Referring now to FIG. 9, there is illustrated a block diagram of a computer operable to execute the disclosed architecture. In order to provide additional context for various aspects of the present invention, FIG. 9 and the following discussion are intended to provide a brief, general description of a suitable computing environment 900 in which the various aspects of the present invention may be implemented. While the invention has been described above in the general context of computer-executable instructions that may run on one or more computers, those skilled in the art will recognize that the invention also may be implemented in combination with other program modules and/or as a combination of hardware and software. Generally, program modules include routines, programs, components, data structures, etc., that perform particular tasks or implement particular abstract data types. Moreover, those skilled in the art will appreciate that the inventive methods may be practiced with other computer system configurations, including single-processor or multi-processor computer systems, minicomputers, mainframe computers, as well as personal computers, hand-held computing devices, microprocessor-based or programmable consumer electronics, and the like, each of which may be operatively coupled to one or more associated devices. The illustrated aspects of the invention may also be practiced in distributed computing environments where certain tasks are performed by remote processing devices that are linked through a communications network. In a distributed computing environment, program modules may be located in both local and remote memory storage devices.

With reference again to FIG. 9, there is illustrated an exemplary environment 900 for implementing various aspects of the invention includes a computer 902, the computer 902 including a processing unit 904, a system memory 906 and a system bus 908. The system bus 908 couples system components including, but not limited to the system memory 906 to the processing unit 904. The processing unit 904 may be any of various commercially available processors. Dual microprocessors and other multi-processor architectures also can be employed as the processing unit 904.

The system bus 908 can be any of several types of bus structure including a memory bus or memory controller, a peripheral bus and a local bus using any of a variety of commercially available bus architectures. The system memory 906 includes read only memory (ROM) 910 and random access memory (RAM) 912. A basic input/output system (BIOS), containing the basic routines that help to transfer information between elements within the computer 902, such as during start-up, is stored in the ROM 910.

The computer 902 further may include a hard disk drive 914, a magnetic disk drive 916, (e.g., to read from or write to a removable disk 918) and an optical disk drive 920, (e.g., reading a CD-ROM disk 922 or to read from or write to other optical media), although all of this hardware is not required for operation in accordance with the subject invention. The hard disk drive 914, magnetic disk drive 916 and optical disk drive 920 can be connected to the system bus 908 by a hard disk drive interface 924, a magnetic disk drive interface 926 and an optical drive interface 928, respectively. The drives and their associated computer-readable media provide nonvolatile storage of data, data structures, computer-executable instructions, and so forth. For the computer 902, the drives and media accommodate the storage of broadcast programming in a suitable digital format. Although the description of computer-readable media above refers to a hard disk, a removable magnetic disk and a CD, it should be appreciated by those skilled in the art that other types of media which are readable by a computer, such as zip drives, magnetic cassettes, flash memory cards, digital video disks, cartridges, and the like, may also be used in the exemplary operating environment, and further that any such media may contain computer-executable instructions for performing the methods of the present invention.

A number of program modules can be stored in the drives and RAM 912, including an operating system 930, one or more application programs 932, other program modules 934, program data 936, and a filter component 937. It is appreciated that the present invention can be implemented with various commercially available operating systems or combinations of operating systems.

A user can enter commands and information into the computer 902 through a keyboard 938 and a pointing device, such as a mouse 940. Other input devices (not shown) may include a microphone, an IR remote control, a joystick, a game pad, a satellite dish, a scanner, or the like. These and other input devices are often connected to the processing unit 904 through a serial port interface 942 that is coupled to the system bus 908, but may be connected by other interfaces, such as a parallel port, a game port, a universal serial bus ("USB"), an IR interface, etc. A monitor 944 or other type of display device is also connected to the system bus 908 via an interface, such as a video adapter 946. In addition to the monitor 944, a computer typically includes other peripheral output devices (not shown), such as speakers, printers etc.

The computer 902 may operate in a networked environment using logical connections to one or more remote computers, such as a remote computer(s) 948. The remote computer(s) 948 may be a workstation, a server computer, a router, a personal computer, portable computer, microprocessor-based entertainment appliance, a peer device or other common network node, and typically includes many or all of the elements described relative to the computer 902, although, for purposes of brevity, only a memory storage device 950 is illustrated. The logical connections depicted include a local area network (LAN) 952 and a wide area network (WAN) 954. Such networking environments are commonplace in offices, enterprise-wide computer networks, intranets and the Internet.

When used in a LAN networking environment, the computer 902 is connected to the local network 952 through a network interface or adapter 956. The adaptor 956 may facilitate wired or wireless communication to the LAN 952, which may also include a wireless access point disposed thereon for communicating with the wireless interface of the adaptor 956. When used in a WAN networking environment, the computer 902 typically includes a modem 958, or is connected to a communications server on the LAN, or has other means for establishing communications over the WAN 954, such as the Internet. The modem 958, which may be internal or external, is connected to the system bus 908 via the serial port interface 942. In a networked environment, program modules depicted relative to the computer 902, or portions thereof, may be stored in the remote memory storage device 950. It will be appreciated that the network connections shown are exemplary and other means of establishing a communications link between the computers may be used.

Figure 10:
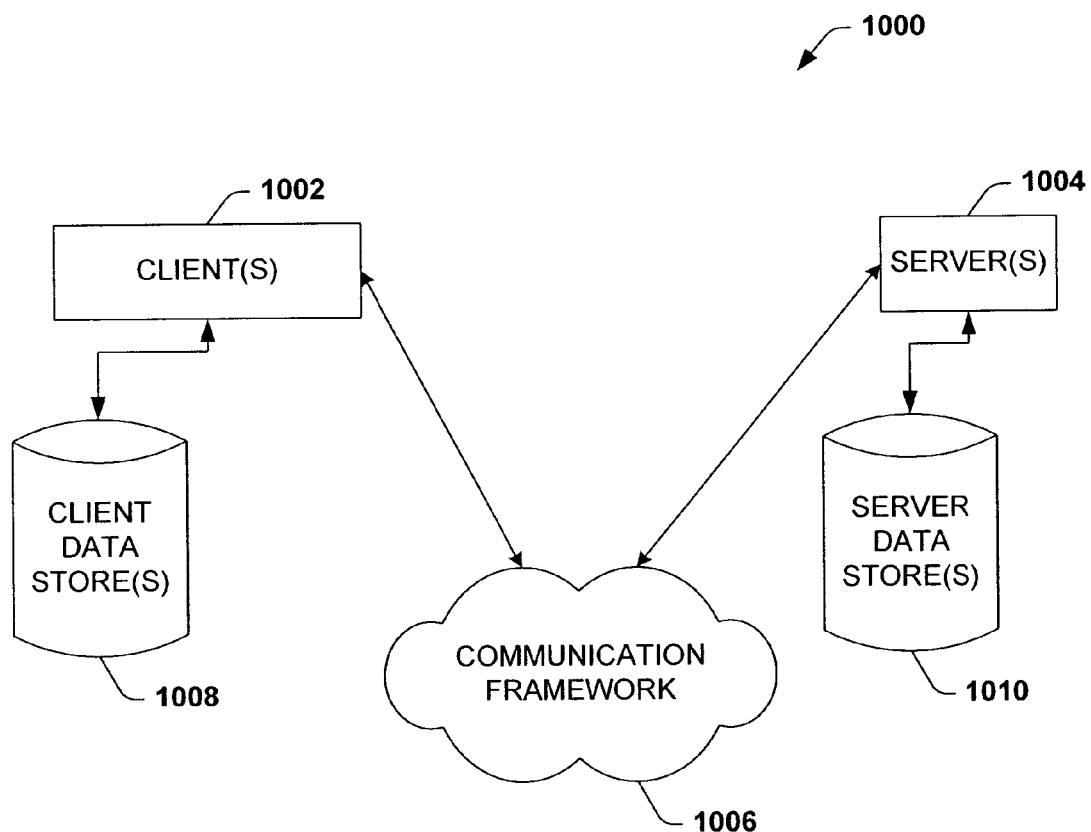
FIG. 10 illustrates a schematic block diagram of an exemplary computing environment in accordance with the present invention.

Referring now to FIG. 10, there is illustrated a schematic block diagram of an exemplary computing environment 1000 in accordance with the present invention. The system 1000 includes one or more client(s) 1002. The client(s) 1002 can be hardware and/or software (e.g., threads, processes, computing devices). The client(s) 1002 can house cookie(s) and/or associated contextual information by employing the present invention, for example. The system 1000 also includes one or more server(s) 1004. The server(s) 1004 can also be hardware and/or software (e.g., threads, processes, computing devices). The servers 1004 can house threads to perform transformations by employing the present invention, for example. One possible communication between a client 1002 and a server 1004 may be in the form of a data packet adapted to be transmitted between two or more computer processes. The data packet may include a cookie and/or associated contextual information, for example. The system 1000 includes a communication framework 1006 (e.g., a global communication network such as the Internet) that can be employed to facilitate communications between the client(s) 1002 and the server(s) 1004. Communications may be facilitated via a wired (including optical fiber) and/or wireless technology. The client(s) 1002 are operably connected to one or more client data store(s) 1008 that can be employed to store information local to the client(s) 1002 (e.g., cookie(s) and/or associated contextual information). Similarly, the server(s) 1004 are operably connected to one or more server data store(s) 1010 that can be employed to store information local to the servers 1004.

What has been described above includes examples of the present invention. It is, of course, not possible to describe every conceivable combination of components or methodologies for purposes of describing the present invention, but one of ordinary skill in the art may recognize that many further combinations and permutations of the present invention are possible. Accordingly, the present invention is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system that facilitates discovery and display of devices, comprising:
   a detection component located on a first wireless device that dynamically identifies a multi-dimensional location of one or more other wireless devices of a network relative to the first wireless device;
   a display component that renders a multi-dimensional representation of respective locations of the devices on the first wireless device;
   the detection component automatically extends a sensing range to detect at least one of a predetermined type of the devices; and
   a classifier that learns user behavior of the first wireless device based on prior usage, to anticipate availability of the one or more other wireless device.

2. The system of claim 1, the multi-dimensional location is a three-dimensional location.

3. The system of claim 1, the respective locations of the one or more devices are displayed relative to the first device.

4. The system of claim 1, the respective locations of at least one of the devices and the first device are displayed on the first device relative to a fixed point.

5. The system of claim 1, the respective locations of the devices whether moving or stationary are displayed dynamically relative to the first device while the first device is moving.

6. The system of claim 1, the first device and one or more devices are moving such that the respective locations of the one or more moving devices are presented dynamically via the display component.

7. The system of claim 1, further comprising a filter that selects a subset of the devices the locations of which are presented by the display component.

8. The system of claim 1, further comprising a filter that facilitates presenting a subset of the devices in a selected volume of space.

9. The system of claim 1, further comprising a filter that filters out barrier materials interstitial to one or more of the devices and the first device such that the devices may be sensed and displayed.

10. The system of claim 1, further comprising a filter that accesses a lookup table of barrier material properties to facilitate sensing and presenting one or more of the devices that are located beyond the corresponding barrier materials.

11. The system of claim 1, further comprising a filter that selects a subset of the devices according to at least one of frequency bandwidth and wireless technology.

12. The system of claim 1, the detection component utilizes analytical results of radio wave characteristics to dynamically determine a location of walls, floors, and other barriers within a given space.

13. The system of claim 1, the devices include at least one of wireless input devices, wireless peripheral devices, and wireless network access points.

14. The system of claim 13, the input devices include at least one of a mouse and a keyboard.

15. The system of claim 1, the first device communicates in at least one of a 2.4 GHz and 5 GHz radio band.

16. The system of claim 1, the first device communicates according to at least one of an IEEE 802.11 standard, an ultrawideband regime, and a radio frequency identification regime.

17. The system of claim 1, the detection component automatically extends a sensing range to detect a predetermined number of the devices.

18. The system of claim 1, further comprising a communication component that receives a map of device locations, which map is presented by the display component in the two- or three-dimensional representation.

19. The system of claim 1, the display component presents at least one of a graphical representation of the devices and a corresponding textual identifier.

20. A portable terminal device according to the system of claim 1.

21. A computer according to the system of claim 1.

22. The system of claim 1, further comprising a classifier that automatically determines which of the devices is available for use by a user of the first device, and which of the available devices to direct the user.

23. The system of claim 22, the classifier directs the user of the first device to the available devices by presenting the two- or three-dimensional representation to the user.

24. The system of claim 22, the classifier is a support vector machine.

25. The system of claim 22, the available devices include data ports.

26. The system of claim 1, the detection component conserves power by beginning at a low signal strength and automatically increasing the signal strength until the desired result is reached.

27. The system of claim 26, the result includes at least one of detecting a predetermined number of the devices, detecting a predetermined number of device types, and reaching a predetermined signal strength.

28. The system of claim 1, the display component facilitates assigning a graphical representation of a vector to a displayed representation of one of the devices, which vector indicates at least one of distance and direction of the device relative to the first device.

29. The system of claim 1, further comprising an input component that accommodates at least one of voice input, touch screen input, and input device signals.

30. A system that facilitates discovery and presentation of devices, comprising:
   a detection component comprised within a new wireless device that dynamically identifies three-dimensional location data of wireless devices of a network relative to the new wireless device;
   a filter component that filters the location data according to predetermined location criteria;
   a presentation component that presents via the new device a two- or three-dimensional graphical representation of respective locations of the devices based on expected availability;
   and
   an artificial intelligence component that determines expected availability based on past usage.

31. The system of claim 30, the respective locations of the devices are displayed relative to the new device, and include a floor identifier associated with the location of an identified device.

32. The system of claim 30, the presentation component includes at least one of audio and video capability.

33. The system of claim 30, the location criteria includes a predetermined volume of space.

34. The system of claim 30, the location criteria includes analyzing and processing barrier materials that interfere with detecting the devices.

35. The system of claim 30, the location criteria includes a fixed detection range based upon a given implementation.

36. The system of claim 30, further comprising a communication component that receives a map of device locations, which map is presented by the presentation component in the two- or three-dimensional representation.

37. A method of discovering and displaying devices, comprising:
   employing a portable terminal for dynamically detecting a multi-dimensional location of a wireless device relative to the portable terminal; and
   presenting a multi-dimensional representation of the locations of the devices on the portable terminal based on actual or expected availability; and
   determining trends from prior user action when accessing wireless devices.

38. The method of claim 37, the location of the device is displayed relative to the portable terminal.

39. The method of claim 37, further comprising dynamically displaying the multi-dimensional representation of the location of the device relative to the portable terminal when the portable terminal is moving.

40. The method of claim 37, further comprising dynamically displaying the multi-dimensional representation of the location of the device relative to the portable terminal when both the device and the portable terminal are moving.

41. The method of claim 37, further comprising filtering a plurality of detected remote wireless devices to select the device.

42. The method of claim 37, further comprising filtering a plurality of detected wireless devices to present only those devices in a selected volume of space.

43. The method of claim 37, further comprising filtering out barrier materials interstitial to the devices and the portable terminal such that the devices may be sensed.

44. The method of claim 37, the device is one of a wireless input device, wireless peripheral device, and wireless network access point.

45. The method of claim 37, further comprising automatically extending a sensing range to detect a predetermined number of the devices.

46. The method of claim 45, the multi-dimensional representation includes at least one of a graphic representative of the device, a text identifier associated with the device, and a location vector that corresponds to an approximate direction and distance of the device relative to the portable terminal.

47. The method of claim 37, further comprising proxying the portable terminal through a device location system such that the location of the wireless device is obtained and presented on the portable terminal.

48. The method of claim 37, further comprising generating at least one map in response to detecting the wireless device, the map presented on the portable terminal to show the location of the device.

49. The method of claim 48, the map is generated dynamically in at least one of a background and a foreground.

50. The method of claim 48, the map is presented while another map is being generated in the background.

51. A system that facilitates the discovery and display of devices, comprising:
   means for dynamically detecting a multi-dimensional physical location of one or more wireless devices on a network relative to a portable terminal based on user behavior; and
   means for presenting on the portable terminal a multi-dimensional representation of the physical location of the device relative to the portable terminal; and
   means for determining user earlier usage when accessing the one or more wireless devices.

52. A computer implemented system comprising:
   an input component for processing management information, the management information is associated with at least one of configuring the computer according to configuration information and detecting the device locations on a network relative to a detected portable terminal;
   a presentation component for presenting a 2-D or 3-D representation of the locations of one or more of the detected devices based upon the management information; and
   an inference component that determines usage trends of wireless devices by the detected portable terminal based on usage history.

53. The computer implemented system of claim 52, the configuration information includes at least one of an implementation, device type, environment, sensing range mode, and filter criteria.

54. The computer implemented system of claim 52, the filter criteria comprises at least one of wireless technology and frequency bandwidth.

55. The computer implemented system of claim 52, further comprising a mapping feature that maps a representative location in space of the detected terminal relative to other detected devices.

56. The computer implemented system of claim 52, the presentation component provides a graphical representation of a location vector that indicates a direction and distance of the computer from the detected terminal.

57. The computer implemented system of claim 52, further comprising a mapping feature that automatically maps device location information according to predetermined spatial criteria.

58. The computer implemented system of claim 52, further comprising a graphical floor layout of individual device location graphics, wherein the floor layout and location graphics are selectable.

59. The computer implemented system of claim 52, the presentation component further comprises at least one of means for selecting a floor in the building and means for selecting one of the device locations.

60. The computer implemented system of claim 52, further comprising a graphical means to display a color and/or a pattern corresponding to user preference information.

61. A system that facilitates discovery and display of devices, comprising:
   a recognition component located on a first wireless device that dynamically identifies a multi-dimensional location of one or more other wireless devices of a network relative to the first wireless device;
   a display component that renders a multi-dimensional representation of respective locations of the devices on the first wireless device;
   the recognition component automatically expanding a sensing range to detect a predetermined quantity of the devices; and
   a classifier that learns user trends when using the first wireless device to anticipate availability of the one or more other wireless device.

62. A system that facilitates discovery and display of devices, comprising:

a finding component located on a first wireless device that dynamically identifies a multi-dimensional location of one or more other wireless devices of a network relative to the first wireless device;

a display component that renders a multi-dimensional representation of respective locations of the devices on the first wireless device;

the finding component saves power by starting at a low signal power and automatically raising the signal power upon reaching the desired result, and a classifier that learns from prior user behavior of the first wireless device to anticipate accessibility of the one or more other wireless devices.

63. A method of discovering and displaying devices, comprising:

employing a portable terminal for dynamically detecting a multi-dimensional location of a wireless device relative to the portable terminal; and presenting a multi-dimensional representation of the locations of the devices on the portable terminal;

automatically extending a detecting range to detect a predetermined number of the devices; and identifying trends in usage history to anticipate availability of the wireless device.

64. A method of discovering and displaying devices, comprising:

employing a mobile terminal for dynamically detecting a multi-dimensional location of a wireless device relative to the mobile terminal;

presenting a multi-dimensional representation of the locations of the devices on the mobile terminal;

dynamically displaying the multi-dimensional representation of the location of the device relative to the mobile terminal when both the device and the mobile terminal are moving, and inferring availability of the wireless device based on prior user behavior.

* * * * *